Feb. 15, 1927.

A. C. JUDD

ROD PACKING

Filed Aug. 23, 1922

Inventor
A. C. Judd
By his Attorneys
Cooper, Kerr & Dunham

Feb. 15, 1927.
A. C. JUDD
1,617,952
ROD PACKING
Filed Aug. 23, 1922   2 Sheets-Sheet 2
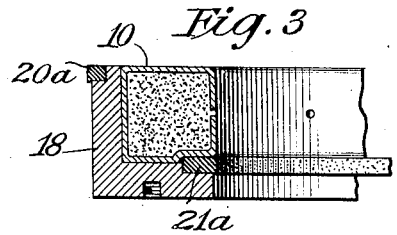
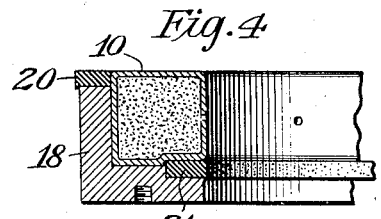
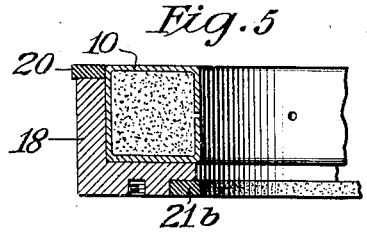
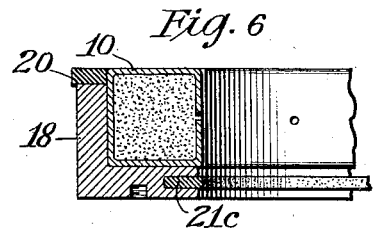
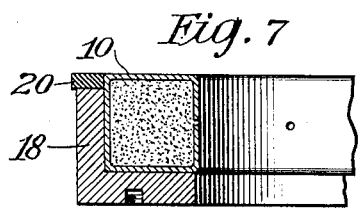
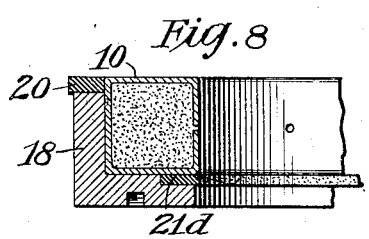
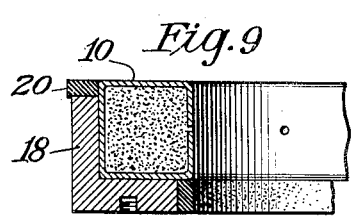
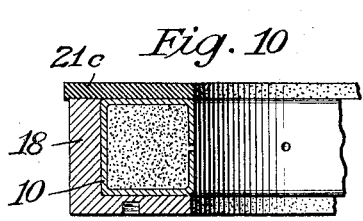
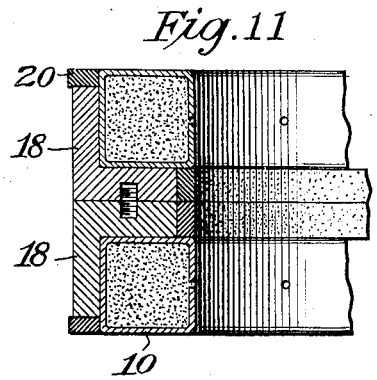
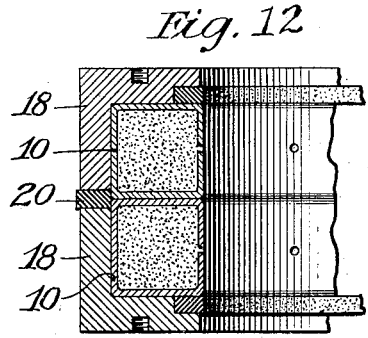
Inventor
A. C. Judd
By his Attorneys
Cooper, Kerr & Dunham Patented Feb. 15, 1927.

1,617,952

UNITED STATES PATENT OFFICE.

ARTHUR C. JUDD, OF NEW YORK, N. Y.

ROD PACKING.

Application filed August 23, 1922. Serial No. 583,704.

This invention relates to packings for piston rods, shafts, plungers, stems and the like, and its chief object is to provide a packing, preferably of the self- or auto-lubricating type, which can be easily and quickly installed and removed. In installing, removing or repairing a packing the machine in which the same is used is necessarily out of commission, and where the machine would otherwise be in operation continuously, night and day, the loss of time thus occasioned may be serious. With a packing constructed and arranged according to my present invention, installation and removal can be effected with ease and dispatch, thereby reducing to a minimum the time consumed in the work. A further object is to provide a packing which will effectively seal the stuffing box against the loss of gaseous or fluid pressure under hot or cold temperature conditions, saturated as well as dry, and in a double-acting as well as in a single-acting compressor, pump, or other machine. With these and other objects in view the invention consists in the novel features of construction and combinations of elements hereinafter described.

Several convenient and effective embodiments of the invention are illustrated in the accompanying drawing, in which—

Figs. 3, 4, 5, 6, 7, 8, 9, 10, 11, and 12 are detail sectional views illustrating other forms of packing units.

The type of packing ring which I prefer to employ is shown at 10, the same consisting of a tubular ring of soft or bearing-metal alloy, filled with lubricating material 11, for example graphite composition, and provided with emission apertures 12 through which the lubricating material is drawn as the piston rod moves. The rod is shown at 13, and 14 designates the stuffing box. To hold the packing in position in the box a gland 15 is provided, which can be pressed into the box and against the packing by any suitable means, as for example, two or more bolts 16. In practice I usually make the packing rings in segmental sections, as indicated by the dotted lines at 17, two sections for each ring being in general the most convenient number, but continuous rings may be used, and in some cases are desirable.

Figure 2:
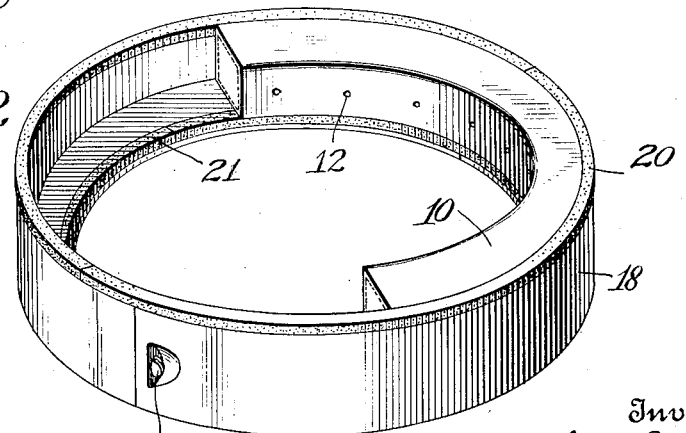
Fig. 2 is a perspective view of one of the packing units in the packing.

In the embodiment illustrated, each packing ring is mounted in an annular cage of L-shaped cross section, as shown for example at 18, and made of steel, cast iron, or other suitable metal. It is advantageous to make the cages in sections, say two in number, as indicated in Fig. 2. By making the rings and cages in parts or sections they can be assembled around the rod without slipping them over the end of the same, an operation which involves detaching the rod at one end or the other from the part connected thereto. If desired the cage sections can be secured together, for example by means of screws set in recesses in the sides of the cage, as at 19. To facilitate insertion of the cages their outer diameter is preferably about a thirty-second of an inch less than the inner diameter of the stuffing box. The clearance thus provided permits movement of the packing transversely to the rod, making the packing float, as it were, and enabling it to follow the rod in any slight deviation thereof from a strictly straight-line motion or to allow for slight bends, humps or other irregularities of surface.

In general the axial thickness of the packing ring is somewhat greater than the depth of the encircling cage, and it will therefore be seen that the compression of the packing by the gland 15 expands the tubular rings radially and hence forces their inner surfaces into fluid-tight contact with the rod, and their outer surfaces into like contact with the cages. The inner and outer surfaces of the yielding gaskets 20 bear more or less firmly against the cages and the stuffing box wall, while the gaskets 21, seated in rabbets in the inner edges of the cage-flanges, bear upon the rod. To provide for easy and quick removal of the cages they are provided in their outer faces with threaded sockets 23, into which suitable extracting rods, not shown, may be screwed.

In the form shown in Fig. 3 the outer gasket 20$^a$ is seated in a rabbet in the outer edge of the cage and the inner gasket 21$^a$ is seated partly in the cage and partly in the packing ring, which are provided with rabbets for the purpose. In Fig. 4 the outer rabbet 20 is positioned in the same way as in Fig. 1, and the inner gasket 21$^a$ is the same as in Fig. 3. In Fig. 5 the inner gasket 21$^b$ is seated wholly in a rabbet in the outer (or lower) flat face or flange of the cage. In Fig. 6 the inner gasket 21ᶜ is seated in a groove in the inner edge of the cage-flange. In Fig. 7 no inner gasket is used. The arrangement shown in Fig. 8 is similar to that of Fig. 1 but the inner gasket 21ᵈ is thinner, say one-half as thick, as gasket 21. In Fig. 9 neither gasket is in a rabbet or recess. In Fig. 10 the outer and inner gaskets are combined in one broad gasket 21ᵉ on the inner (or upper) face of the packing unit.

Figure 1:
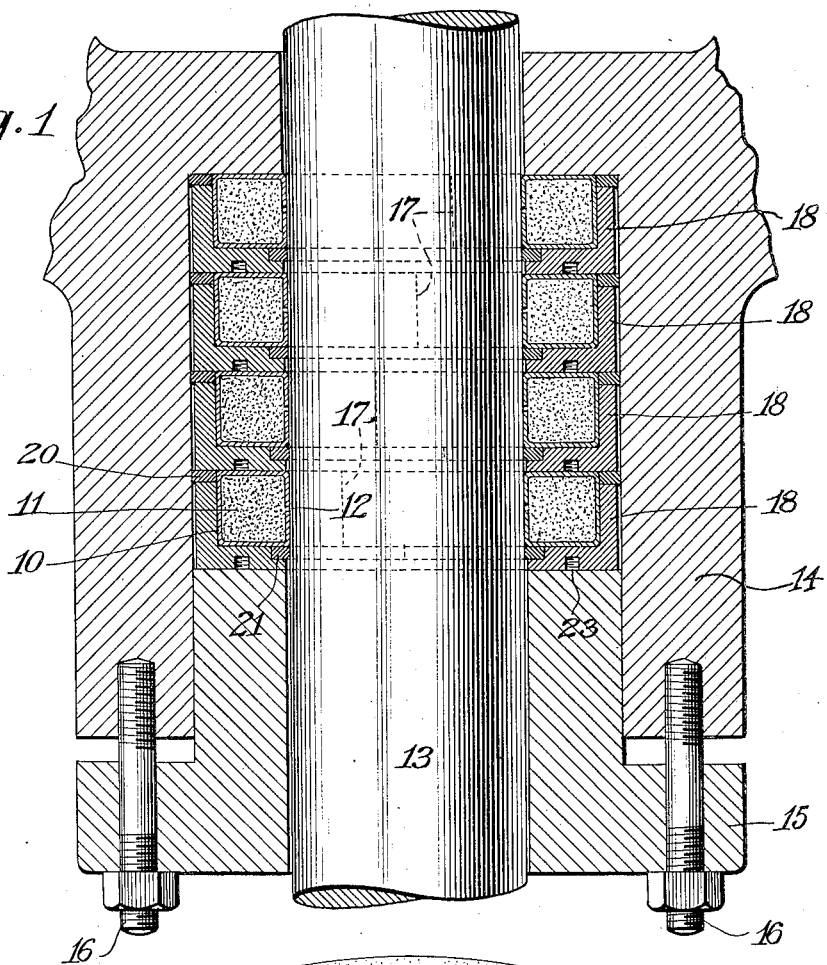
Fig. 1 shows in longitudinal section one form of my improved packing, as arranged for use in a stuffing box.

Preferably the packing units are arranged as in Fig. 1, with the packing ring 10 of one unit facing the flange of the cage 18 of the adjoining unit, but they may be arranged as in Fig. 11, for example, with the flanges of two adjoining cages together, or as in Fig. 12, with the two packing rings together. In the last two arrangements the gaskets can be located in any suitable position and the adjoining portions of the two cages can be integral with each other if desired.

The gaskets may be made of any suitable material, as for instance oil-proof rubber, compressed asbestos, leather, etc.

What I claim is:

1. In a packing for piston rods and the like, the combination with the rod; of a plurality of annular cages of L-shaped cross section encircling the rod and having their radially extending portions directed toward the rod; hollow, soft metal packing rings containing plastic lubricant in the cages, the rings being axially thicker than the axial depth of the respective cages; gaskets arranged between the cages and around the packing rings; and means for holding the cages and rings in position around the rod.

2. In a packing for piston rods and the like, the combination with the rod, and a stuffing box encircling the same; of a plurality of annular cages of L-shaped cross section independent of each other and having their radially extending portions directed toward the rod; hollow, soft metal packing rings containing plastic lubricant in the cages, the rings being axially thicker than the axial depth of the respective cages; gaskets arranged between the cages and around the packing rings; and means for holding the cages, rings and gaskets in position.

3. In a packing for piston rods and the like, the combination with the rod, and a stuffing-box encircling the same; of a plurality of annular cages of L-shaped cross section in the stuffing box, encircling the rod and having their radially extending portions directed toward the rod, the several cages being independent of each other; hollow, soft metal packing rings containing plastic lubricant in the cages, the rings being axially thicker than the axial depth of the respective cages; gaskets arranged between the cages and around the packing rings; and means for holding the cages and rings in the stuffing box under axially-exerted pressure.

4. In a packing for piston rods and the like, the combination with the rod, and a stuffing box encircling the same; of a plurality of annular cages of L-shaped cross section independent of each other and having their radially extending portions directed toward the rod; hollow, soft metal packing rings containing plastic lubricant in the cages, the rings being axially thicker than the axial depth of the respective cages; gaskets arranged between the cages, outside of the rings; and means for exerting pressure axially on the packing rings, whereby the cages are pressed toward each other and the rings are held in close contact with the rod and the gaskets in close contact with the inner wall of the stuffing box.

5. In a packing for piston rods and the like, the combination with the rod, and a stuffing box encircling the same; of a plurality of annular cages of L-shaped cross section independent of each other and having their radially extending portions directed toward the rod; hollow, soft metal packing rings containing plastic lubricant in the cages, the rings being axially thicker than the axial depth of the respective cages; gaskets arranged between the cages, outside of the rings; gaskets between the packing rings and the respective cages, adjacent to the rod; and means for exerting pressure axially on the packing rings whereby the cages are pressed toward each other and the packing rings are held in close contact with the rod and the gaskets in close contact with the rod and with the inner wall of the stuffing box.

In testimony whereof I hereto affix my signature.

ARTHUR C. JUDD.